(12) United States Patent
Yoshiike et al.

(10) Patent No.: US 6,211,787 B1
(45) Date of Patent: Apr. 3, 2001

(54) CONDITION DETECTING SYSTEM AND METHOD

(75) Inventors: Nobuyuki Yoshiike, Ikoma; Katsuya Morinaka, Hirakata; Shinji Tanaka, Kadoma, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/408,229

(22) Filed: Sep. 29, 1999

(30) Foreign Application Priority Data

Sep. 29, 1998 (JP) .................................................. 10-276075

(51) Int. Cl.$^7$ .................................................. G08B 23/00
(52) U.S. Cl. ...................................... 340/573.1; 340/573.4; 340/573.5; 340/541; 600/595; 600/587; 250/342; 367/99
(58) Field of Search ............................ 340/573.1, 573.4, 340/573.5, 554, 522, 541, 565; 600/595, 587; 257/338.1, 342, 221; 374/142, 124, 45; 379/38, 39, 47, 51; 710/18; 367/99, 107, 112, 116

(56) References Cited

U.S. PATENT DOCUMENTS

| 4,845,682 | * | 7/1989 | Boozer et al. .......................... 367/93 |
| 4,875,198 | * | 10/1989 | Ariav ...................................... 367/93 |
| 5,043,705 | * | 8/1991 | Rooz et al. ........................ 340/573.1 |
| 5,097,454 | * | 3/1992 | Schwarz et al. ........................ 367/93 |
| 5,692,215 | * | 11/1997 | Kutzik et al. ............................ 710/18 |
| 5,877,688 | * | 3/1999 | Morinaka et al. .................... 340/584 |

* cited by examiner

Primary Examiner—Benjamin C. Lee
(74) Attorney, Agent, or Firm—Ratner & Prestia

(57) ABSTRACT

Condition detecting system has a detecting device (1) including a plurality of pieces of distance sensors arranged at one corner of an observing sector such as a toilet, a judging device for judging the condition of a staying person in the observing sector on the basis of the information from the detecting device (1), a signal transmitting section for transmitting the results of judgment, and a warning device for issuing a warning on the basis of the signal from the signal transmitting section, and the plurality of pieces of distance sensors are set to perform detection in a plurality of different directions by using infrared ray beams.

22 Claims, 17 Drawing Sheets

CONDITION DETECTING SYSTEM AND METHOD

BACKGROUND OF THE INVENTION

1. Field of the Invention

The present invention relates to a condition detecting system and method which performs detection of the condition of a person in an observing sector in a building or a house by using detecting means including a plurality of distance sensors.

2. Related Art of the Invention

Previously, in order to detect the condition of a person in a specific area, it has been normally practiced that a picture in the space is measured by a CCD camera or an infrared ray camera and an observer directly performs observation through a monitoring screen, or that a person in the area is cut out of the picture and the recognition of the person is performed by a picture recognizing system.

In the former case, it is necessary to watch the monitoring screen at all times, and it is difficult to cover a plurality of observing areas, and in the latter case, the system is considerably expensive, and the uses are limited. Furthermore, judgment is difficult as for the attitude of the person or the like.

Moreover, a method of using an observing camera like this ignores the privacy of a patient in a hospital or a facility, which causes a problem. For example, in a toilet of the hospital or the like, in case when a long time has elapsed after a patient entered, there is an anxiety about the safety of the patient, and in case of a conventional method, it is necessary to confirm whether the patient is staying there for a long time or not, or whether the patient has fallen down in the toilet or not.

However, the confirmation must be performed while maintaining privacy. For that, a patrol, a nurse, or the like performs checking, and both labor and time are required, and there has been no simple, easy, and inexpensive system which can detect the condition of the patient staying in an observing sector such as a toilet.

SUMMARY OF THE INVENTION

The present invention is made due to the above various conventional problems, and it is an object of the present invention to provide a condition detecting system and method, which detects simply and at a low cost the condition of an observing sector such as a toilet in a home of a solitary old person, a hospital, a nursing facility, or the like while maintaining privacy.

The present invention relates to a condition detecting system and method for detecting the existence and the condition of a person in a specific observing sector, which comprises detecting means including a plurality of pieces of distance sensors arranged at one corner of the observing sector and judging the condition of a staying person in the observing sector on the basis of the information from the detecting means.

Furthermore, the present invention relates to a condition detecting system and method for detecting the condition of a person covering a plurality of observing sectors, wherein detecting means including a plurality of pieces of distance sensors is arranged at one corner of each observing sector, and each output signal of the detecting means is inputted into one judging means for judging the condition of a staying person in the observing sector, on the basis of the information from the detecting means.

Furthermore, in the present invention, it is preferable that warning means can be reset by warning canceling means arranged on the corridor side of the entrance of each observing sector, and further, it is preferable that the alarm of a centralized control unit works together with a warning lamp. Furthermore, it is preferable that the measurement, detection, and judgment are automatically performed by using a passage sensor when the electric power is fed into the centralized control unit.

That is, a highly reliable and inexpensive condition detecting system and a method of using the system can be obtained, wherein a plurality of distance sensors are arranged on a ceiling or a side portion of an observing sector such as a toilet of a hospital or a nursing facility, and the presence or absence of a person is judged from the output signal of a sensor by using a judgment circuit or the abnormal condition is judged from the attitude of a person staying in the room, and the conditional information outputted from these judgment circuits is centralizedly controlled through an Ethernet, a nurse call system, or the like provided in the hospital, and an observing sector in use or an abnormal room is displayed on a monitor screen of a central control unit by means of communications in the building, and a warning is issued, so that abnormality in the observing sector or in the room can easily be reported to other persons.

According to the present invention, it is possible to easily obtain the staying information of a user and the presence or absence of an abnormal condition during the staying in an observing sector such as a toilet, a washing room, a bath room, a laundry, or a common facility for rest of a home of a solitary old person, a hospital, a facility, or the like by the above person detecting system, and further, it is also possible to sufficiently obtain the safety in case of being in use for a long time, since the conditional information is reported to other persons by a warning lamp or the like. Moreover, the sensor signals can be collectively processed by a judgment circuit provided in each room, and further, since the signals are introduced into a network in the building so that the service conditions of rooms, observing sectors, or the like may be cetralizedly controlled by using a central control unit, it is possible to obtain a condition detecting system of a person at a low cost. Especially, since the condition judgment of a person in the observing sector is performed by a judgment circuit and only the signal of the observing sector in an abnormal condition is transmitted to the central control unit, a real time observation can be performed.

Furthermore, according to the present invention, it is possible to obtain an accurate, high speed, and highly reliable condition detecting method of staying in a room by the above condition detecting method of the person. Furthermore, since the information from a plurality of sensors is processed by 1 piece of judgment circuit and only the necessary information is transmitted to the central processing unit through a system of communications such as an Ethernet, a real time observation can be performed, and the cost can also be reduced. Thus, this condition detecting system of the person and the method are very simple in terms of a system, and by using this sensor system, an accurate person detection can easily be performed at a low cost. Accordingly, by using the present invention, a condition detection with high reliability and high safety is effectively achieved, easily and highly accurately.

DESCRIPTION OF SYMBOLS

Figure 1:
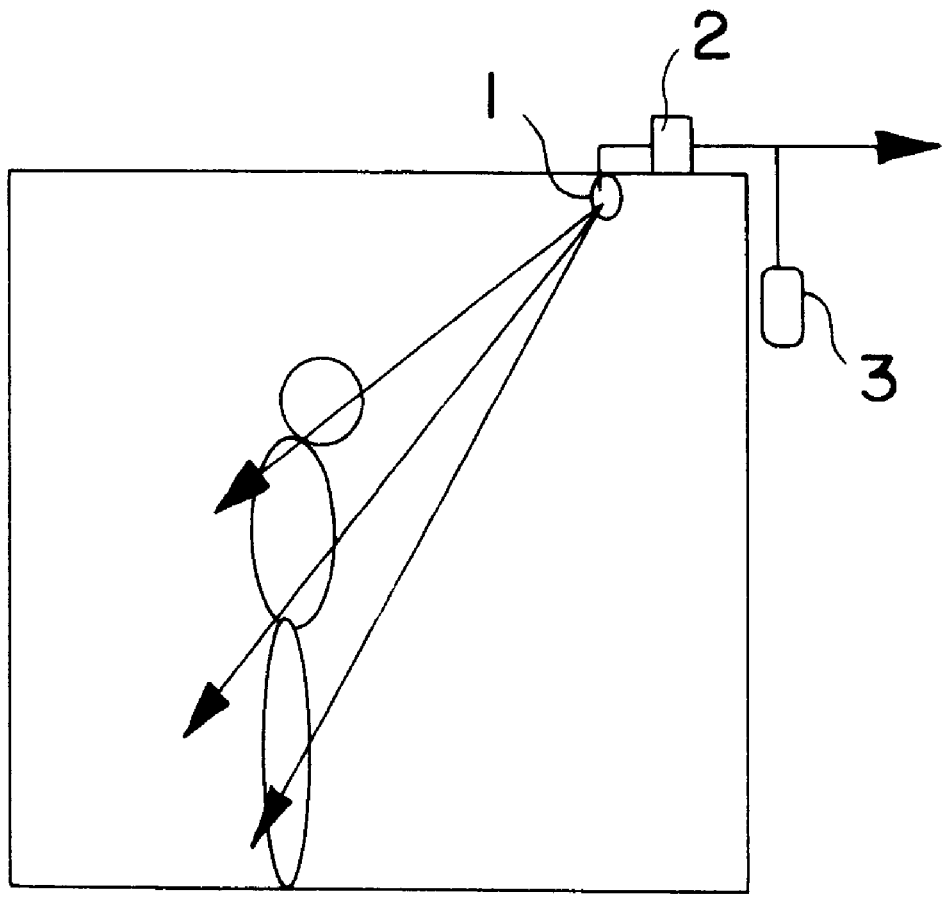
FIG. 1 is a condition detecting system according to a first embodiment of the present invention.

1 Detecting means
10 Distance sensor
101 Infrared ray emitting section
102 Infrared ray receiving section
110 Irradiated light
111 Reflected light
12 Rotary scanning section
2 Signal processing means
20 CPU
21 Memory
22 Data transmitting section
3 Warning means
30 Alarm
32 Warning canceling means
40 Person
50 Toilet bowl
60 Washing stand
71 Washing place
72 Bath tub
8 Central control means Preferred Embodiments (Embodiment 1)

A condition detecting system according to a first embodiment of the present invention will be described by referring to drawings.

Figure 2:
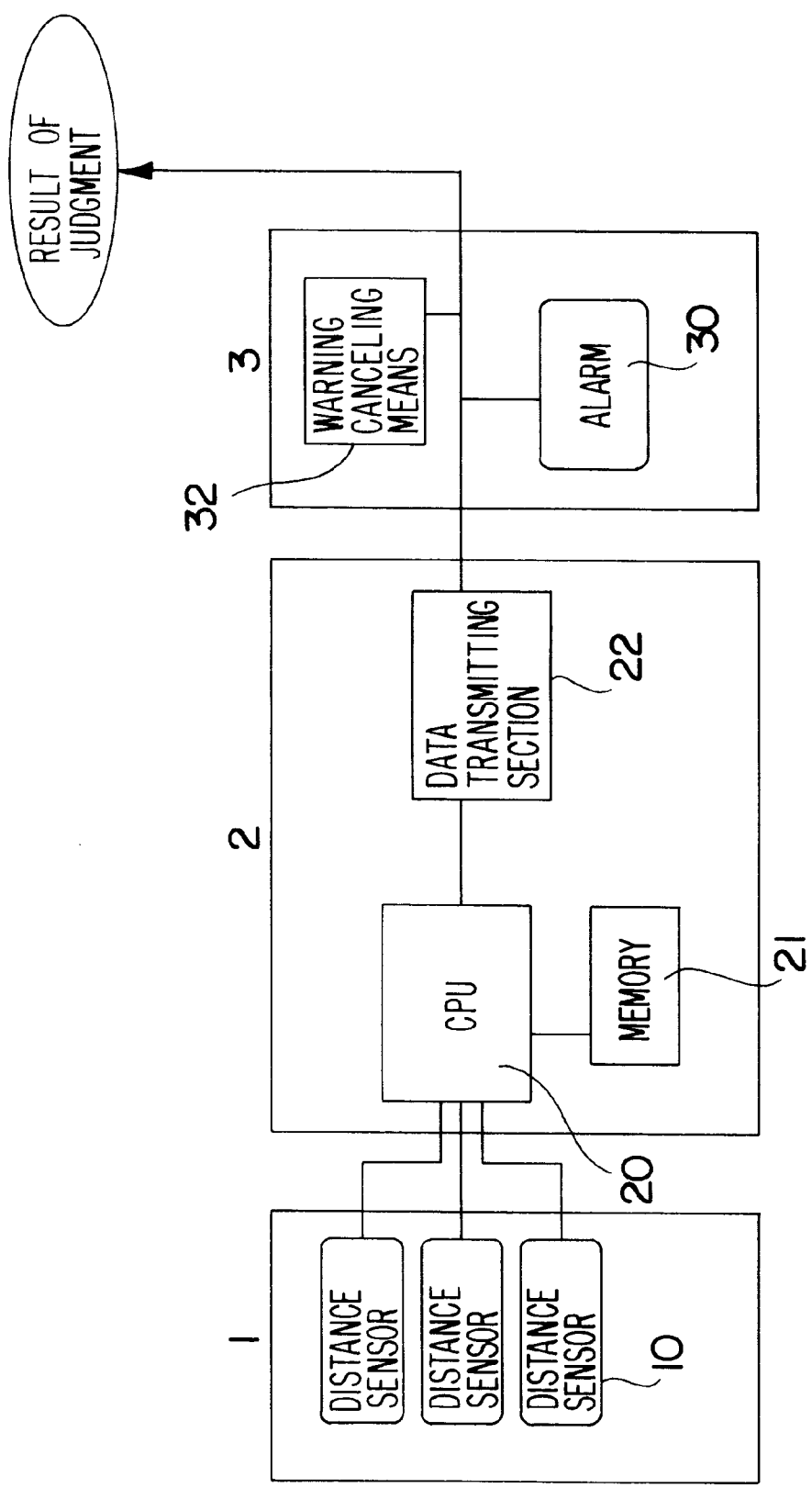
FIG. 2 is a signal processing mode according to the first embodiment of the present invention.

FIG. 1 and FIG. 2 are figures for describing a first embodiment of the present invention. In the figures, the signal obtained from detecting means 1 including a plurality of pieces of distance sensors 10 arranged on the ceiling or the side of an observing sector is used to judge the condition of a person in signal processing means 2. The signal processing means 2 comprises a CPU 20, a memory 21 containing the information to be the criterion, and a data transmitting section 22, and it judges the condition of a person by comparing the criterion and the input signal, and it transmits the judgment results to the outside by the data transmitting section 22.

For example, when it is judged that a person entered the observing sector and the person is still in the room after a certain time has elapsed, or when it is judged that the attitude has become an attitude which does not occur under normal conditions, a signal of abnormality is transmitted to the outside. In case of a condition detecting and reporting system, warning means 3 is further provided on a wall surface out of the room or the like, and an alarm 30 is operated by a signal of abnormality to inform other persons.

Here, it is also possible to integrate a plurality of distance sensors as 1 unit. Furthermore, it is also possible to integrate detecting means and signal processing means as 1 unit. Moreover, it is also possible to provide warning canceling means 32 to cancel the condition where the warning is operated.

Figure 3:
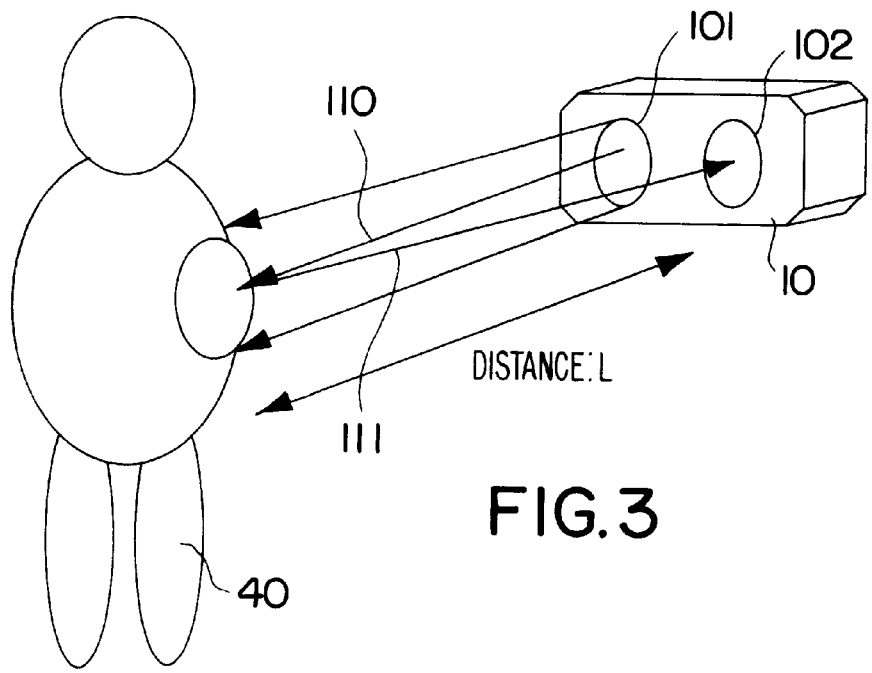
FIG. 3 is a schematic drawing describing the measurement principle of a distance sensor according to the first embodiment of the present invention.

FIG. 3 is a type drawing for describing the principle of 1 distance sensor. The distance sensor 10 emits light of infrared rays with a narrowed beam diameter from an infrared ray emitting section 101 including LED, and it detects the infrared rays reflected from a person 40 to be detected by an infrared ray receiving section 102 and detects a distance L to the person to be detected. As a detecting principle, a method of calculating from the angle of incidence of the reflected light by using the trigonometry, and a method of calculating from a phase difference between the irradiated light and the incident light can be used. According to these methods, the direction (area) to be detected can be determined in advance by the direction of the distance sensor. Furthermore, a detection fitted to the size of a body can be performed by changing the beam diameter by using an optical lens.

Figure 4:
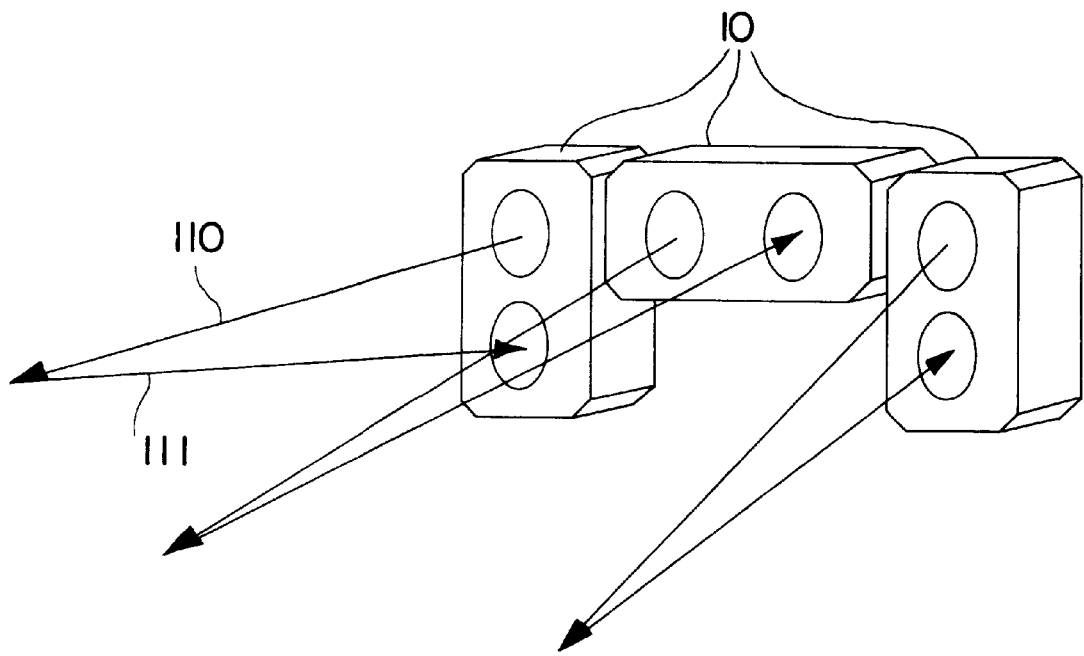
FIG. 4 is a schematic structural drawing of a distance sensor according to the first embodiment of the present invention.
Figure 5:
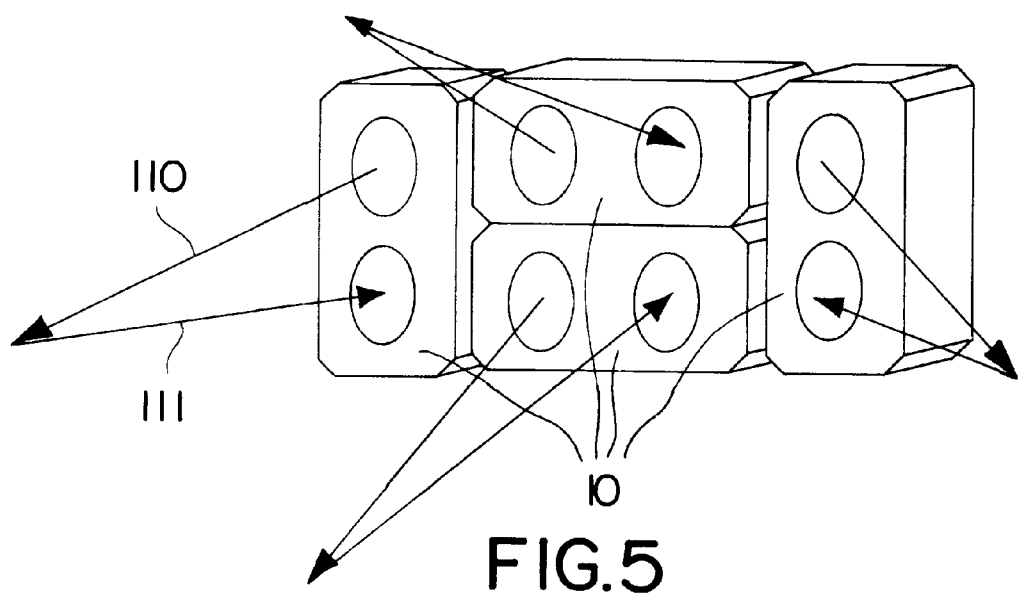
FIG. 5 is a schematic structural drawing of a distance sensor according to the first embodiment of the present invention.

FIG. 4 shows a type drawing of a plurality of pieces of distance sensors in the first embodiment of the present invention. As shown in FIG. 4, the observing sector can freely be set by setting 3 distance sensors in different directions separately and integrating them. Furthermore, the number of pieces of the distance sensors is not limited to 3, and as shown in FIG. 5, the condition of a person in the observing sector can more clearly be detected by integrally providing 4 distance sensors for performing detection in 4 different directions.

Figure 6:
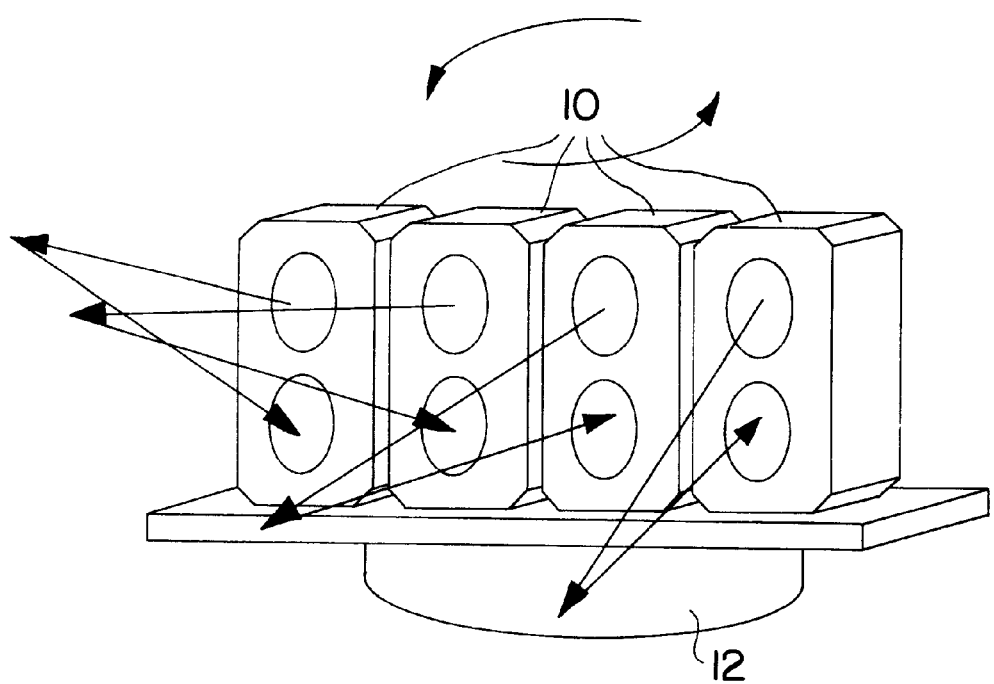
FIG. 6 is a schematic structural drawing of a distance sensor according to the first embodiment of the present invention.

Furthermore, as shown in FIG. 6, a plurality of distance sensors capable of performing detection in different directions are integrated, and the integrated sensors are made to perform rotary scanning by a rotary scanning section 12, and according to the rotation, the distance information in each direction of rotation is obtained, and consequently, 2-dimentional distance information can be obtained. According to such a method, the condition of the person in the observing sector can more accurately be detected. Moreover, it is also possible that a plurality of pieces of distance sensors are distance sensors using infrared ray beams or they are ultrasonic sensors by using transmitting and receiving of ultrasonic waves or they are combinations of the 2 kinds of sensors. Here, it is also possible to more accurately detect the condition of the person by making combination with a thermal type sensor such as a pyroelectric sensor.

(Embodiment 2)

A condition detecting system according to a second embodiment of the present invention will be described by referring to drawings.

Figure 7A:
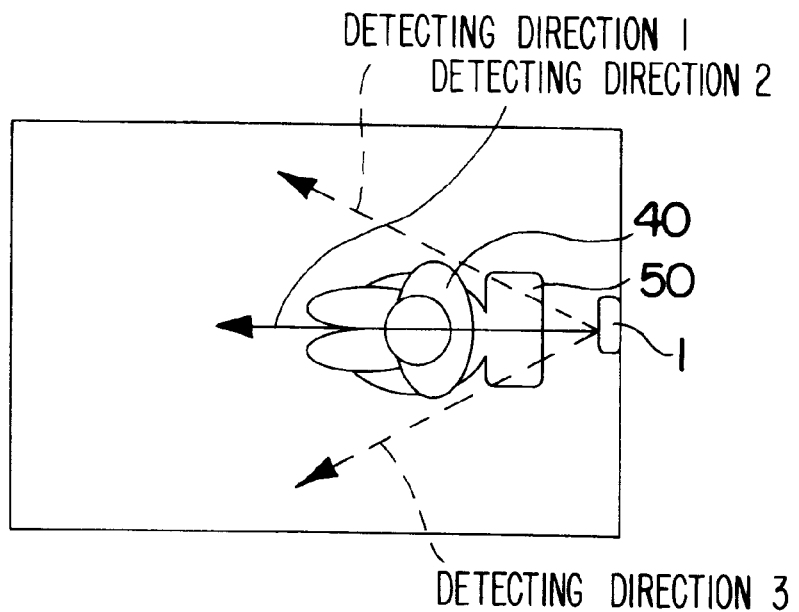
FIG. 7 is a schematic structural drawing describing a second embodiment of the present invention.
Figure 7B:
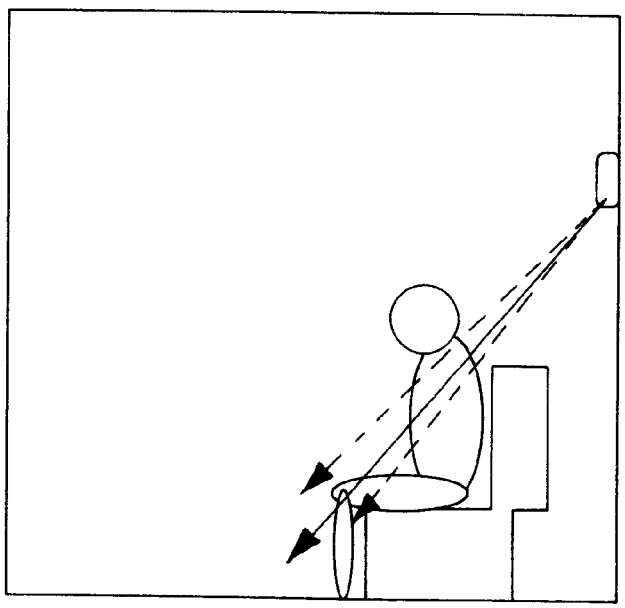

FIG. 7 to FIG. 13 are figures for describing the second embodiment in a toilet of the present invention. In FIG. 7, (a) is a plan view seen from a ceiling, and (b) is a figure seen from the side. In FIG. 7, detecting means 1 including at least 3 pieces of distance sensors arranged on the side of a toilet which is an observing sector is provided, and it is set to be able to perform detection in the direction of a person 40 sitting on a toilet bowl 50 diagonally from the upper.

The processing method of the signal obtained from the detecting means 1 is similar to that in the Embodiment 1.

Now, in the case where a person entered the toilet and sat down on the toilet bowl, when it is judged by signals of 3 distance sensors that the person is still in the room after a certain time has elapsed, or when it is judged that the person is in an attitude which does not occur under normal conditions, a signal of abnormality is transmitted to the outside. A method thereof will be described below in detail.

Figure 8:
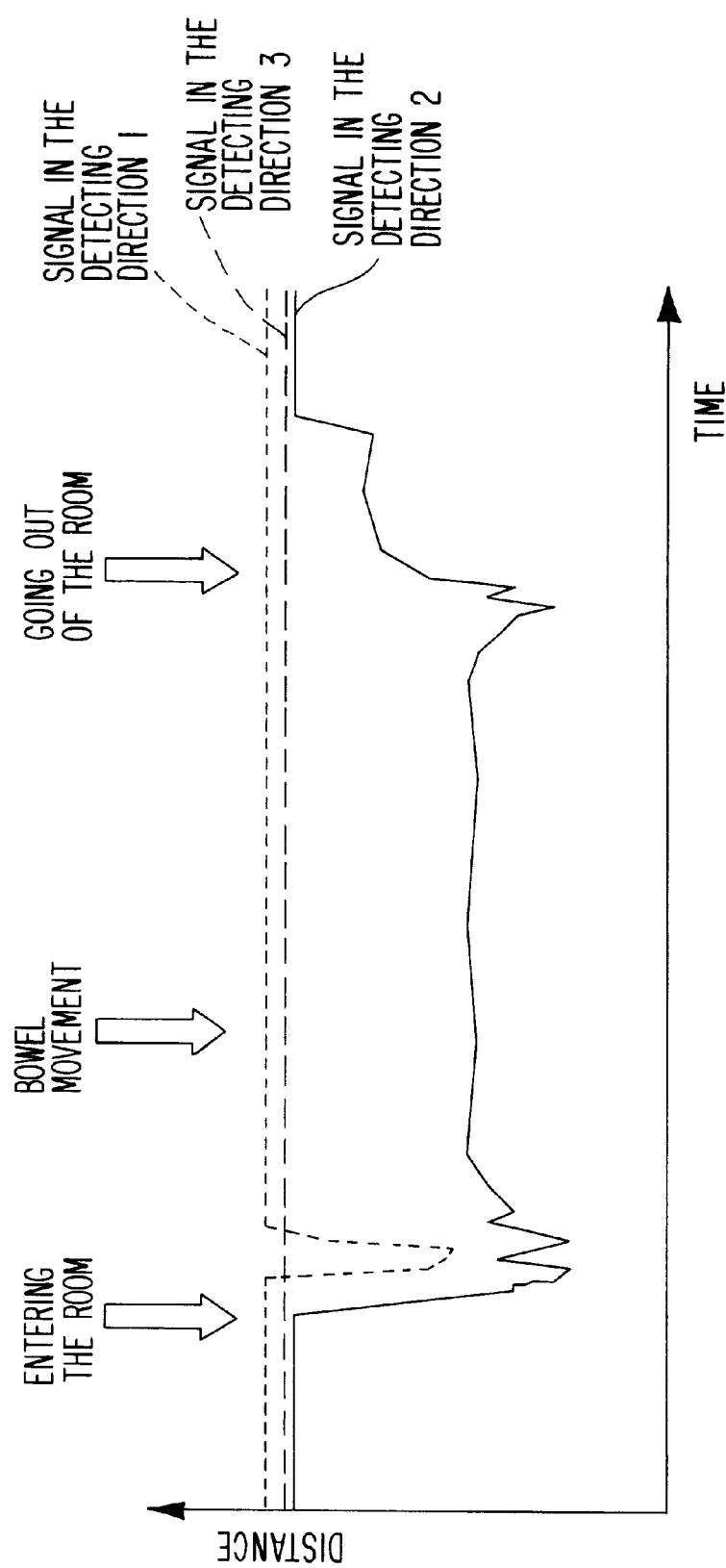
FIG. 8 is an explanation drawing of the sensor signal change describing the second embodiment of the present invention.

In the figure, the detecting directions of 3 distance sensors mounted in the detecting means 1 arranged on a side wall are set such that the detecting directions 1, 3 are set to face to the left and right sides and the detecting direction 2 is set to face diagonally to the front under. In the case when the toilet is used under normal conditions, the distance information of the 3 distance sensors buried in the detecting means 1 becomes as shown in FIG. 8. That is, the information of the distance sensor in the detecting direction 2 is changed to that in a short condition from that in a long condition from the sensor to the floor, since the information is significantly fluctuated because of the person 40 sitting on the toilet bowl. On the other hand, the sensor information in the left and right detecting directions 1, 3 does not significantly changes. In the example of FIG. 8, the signal in the detecting direction 1 changes temporarily after entering the room, but there is no problem since it means a condition where the body is swaying and it is canceled at once. The condition shown in FIG. 8 is generally a normal condition, but, for example, in the case when the time is such a long time as 20 minutes or more, the condition is judged abnormal and a signal of abnormality is issued.

Figure 9:
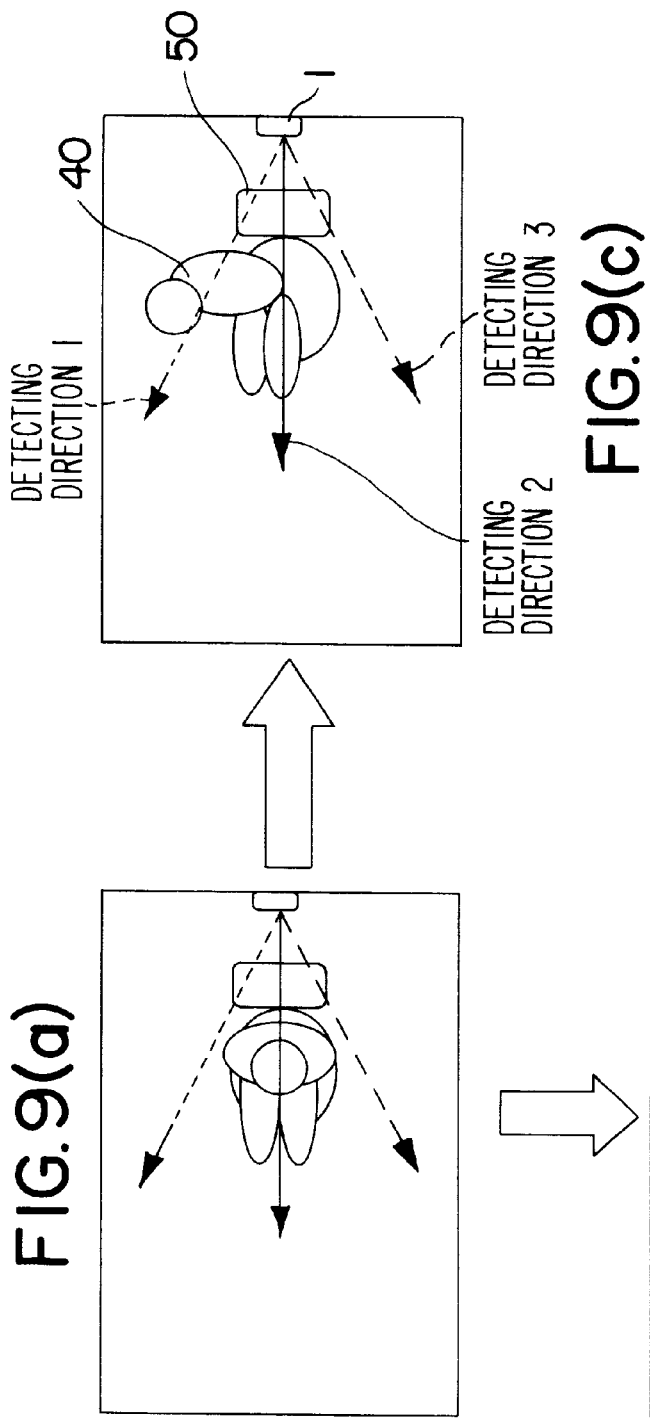
FIG. 9 is a schematic structural drawing describing another mode of the second embodiment of the present invention.
Figure 10:
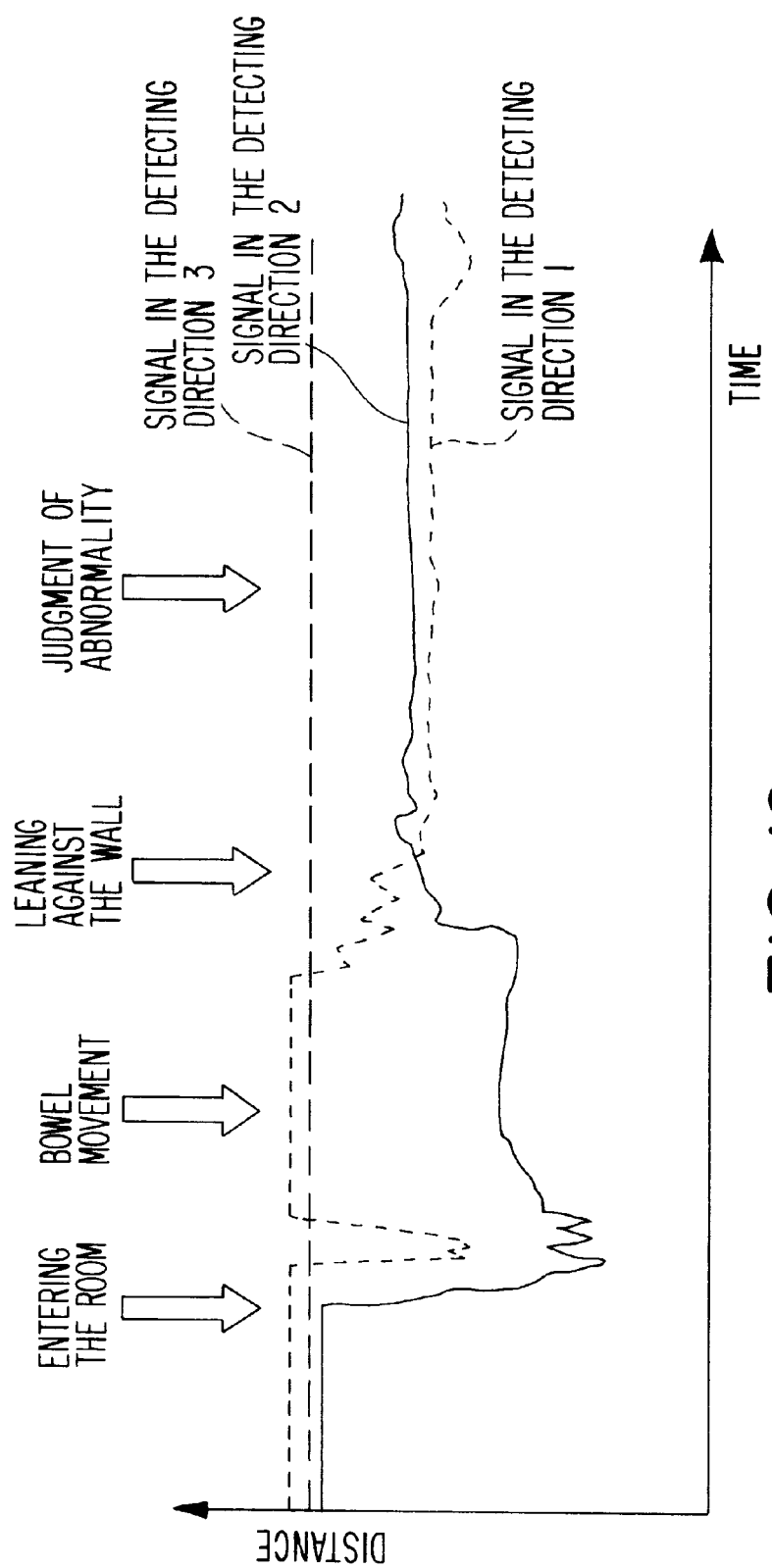
FIG. 10 is an explanation drawing of the sensor signal change describing another mode of the second embodiment of the present invention.
Figure 11:
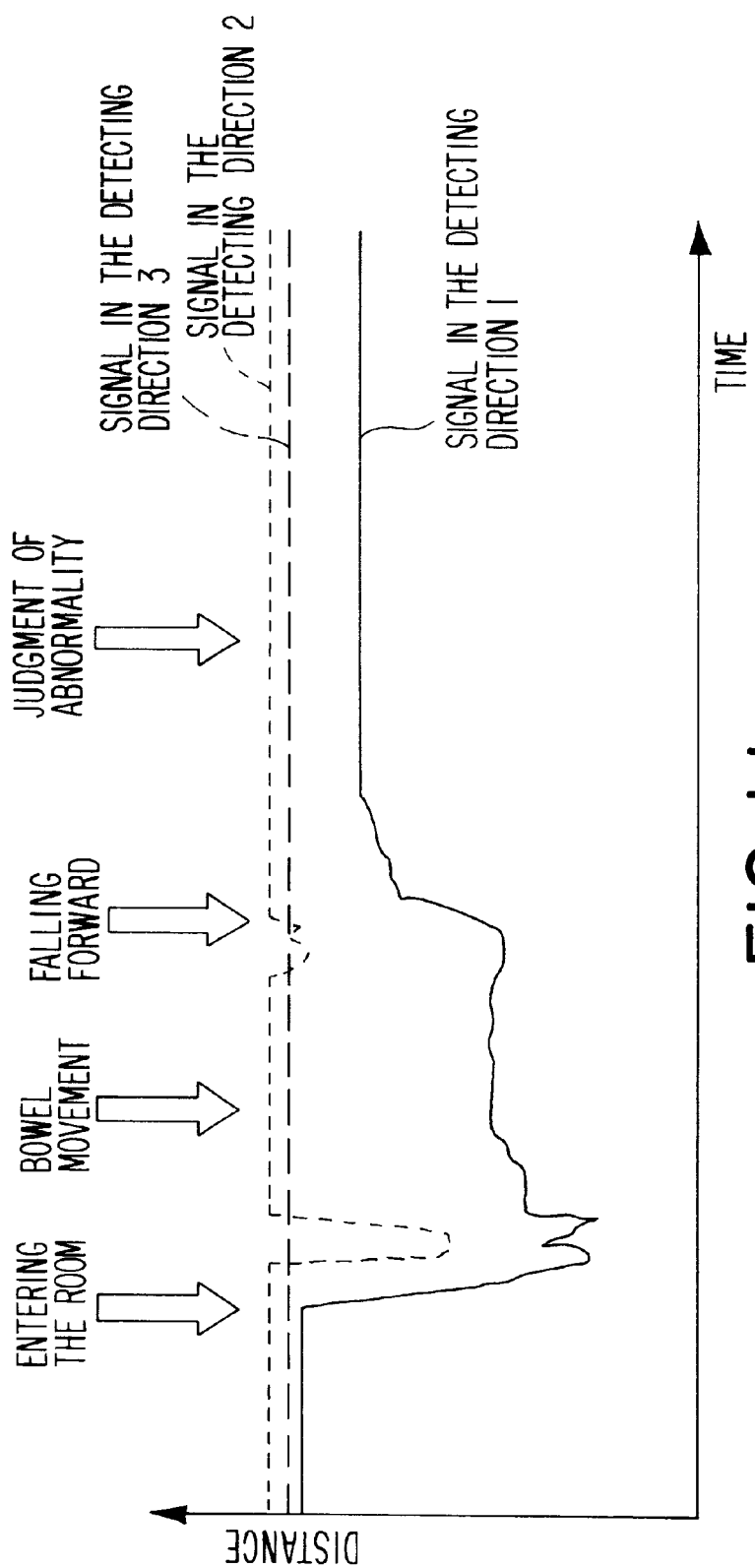
FIG. 11 is an explanation drawing of the sensor signal change describing another mode of the second embodiment of the present invention.
Figure 12A:
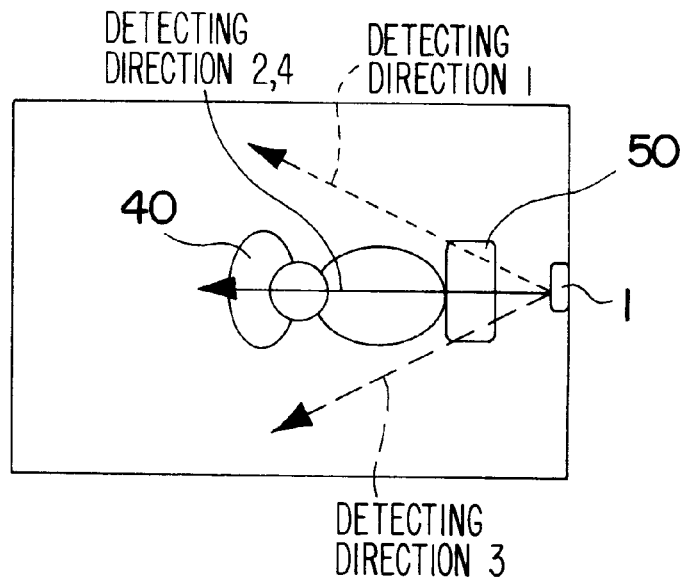
FIG. 12 is a schematic structural drawing describing another mode of the second embodiment of the present invention.
Figure 12B:
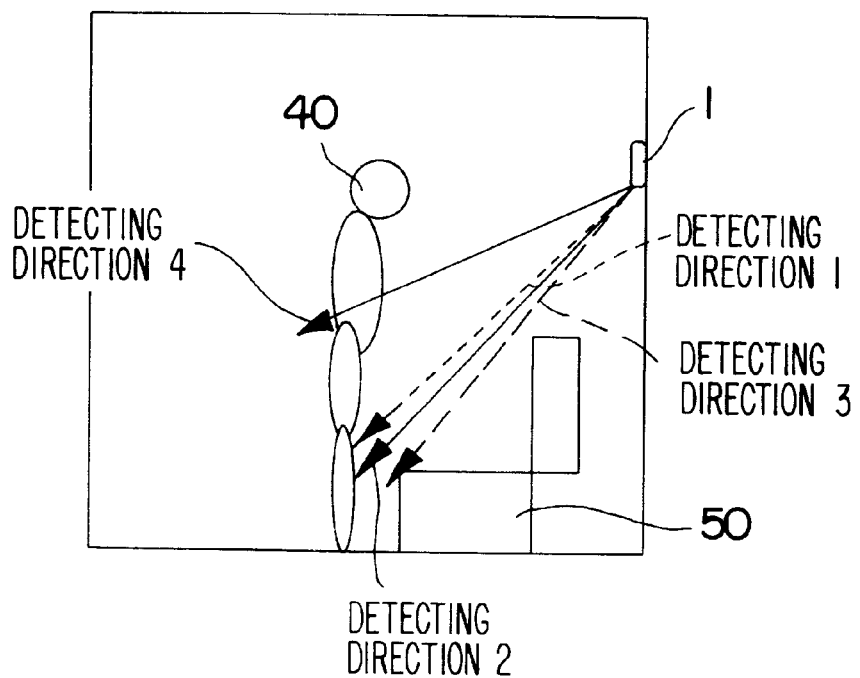

Next, in the case when the condition has shifted from the condition in FIG. 9 (a) to the condition in FIG. 9 (c) where the person is leaning against the wall, the distance information in the detecting direction 1 becomes abnormal as shown in FIG. 10, and in the case when this time continues, for example, for such a long time as 5 minutes or more, the condition is judged abnormal and a signal of abnormality is issued. Furthermore, in the case when the condition has shifted from the condition of (a) to the condition of (b) where the person has fallen forward, the distance information in the detecting direction 2 becomes abnormal as shown in FIG. 11, and in the case when this time continues, for example, for such a long time as 5 minutes or more, the condition is judged abnormal and a signal of abnormality is issued.

Figure 13A:
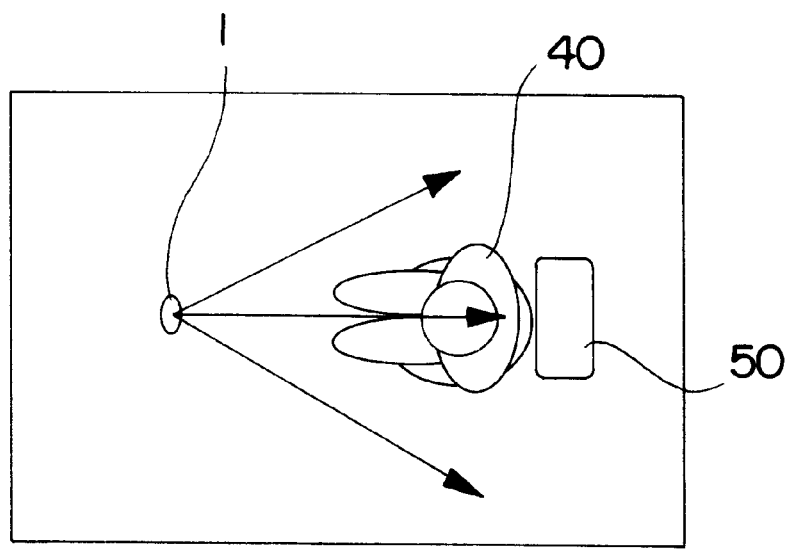
FIG. 13 is a schematic structural drawing describing another mode of the second embodiment of the present invention.
Figure 13B:
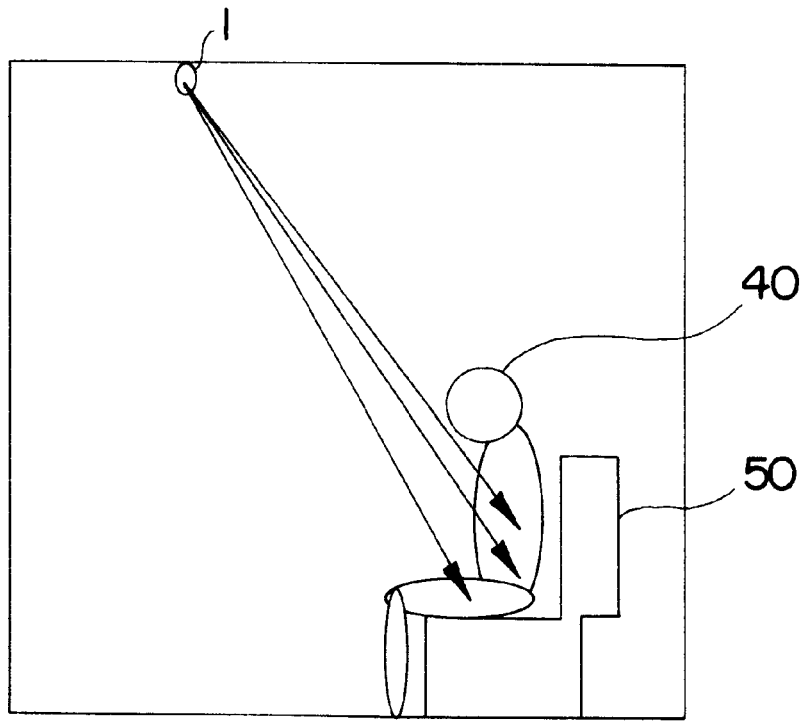

As mentioned above, in the toilet, an abnormal condition can be judged by the information of 3 distance sensors. Furthermore, as the detecting means 1, 4 distance sensors are set in the directions shown in FIG. 12 to be used, so that the behavior of a person who stands up and uses the toilet can also be more accurately grasped. Here, the detecting direction 4 is set to detect a position above the positions in the detecting directions 1, 2, 3. Moreover, even if the detecting means 1 is not provided on the wall surface but it is provided on the ceiling portion as shown in FIG. 13, it can be used similar to that of the above description by adjusting the directions of the distance sensors.

(Embodiment 3)

A condition detecting system according to a third embodiment of the present invention will be described by referring to drawings.

Figure 14A:
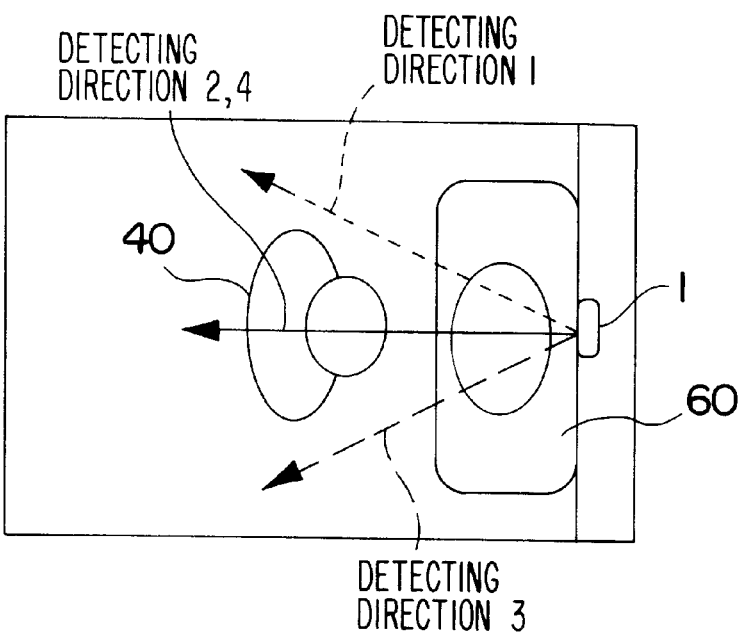
FIG. 14 is a schematic structural drawing describing a third embodiment of the present invention.
Figure 14B:
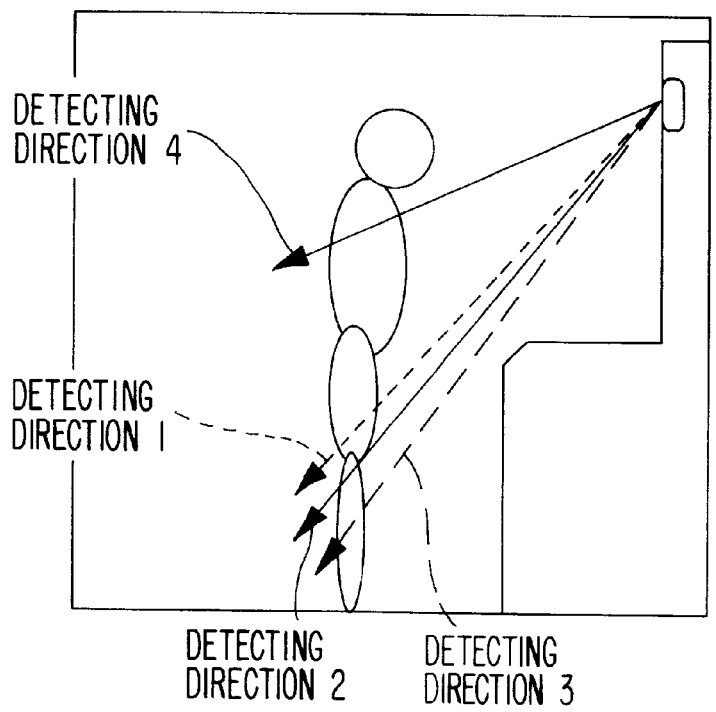
Figure 15:
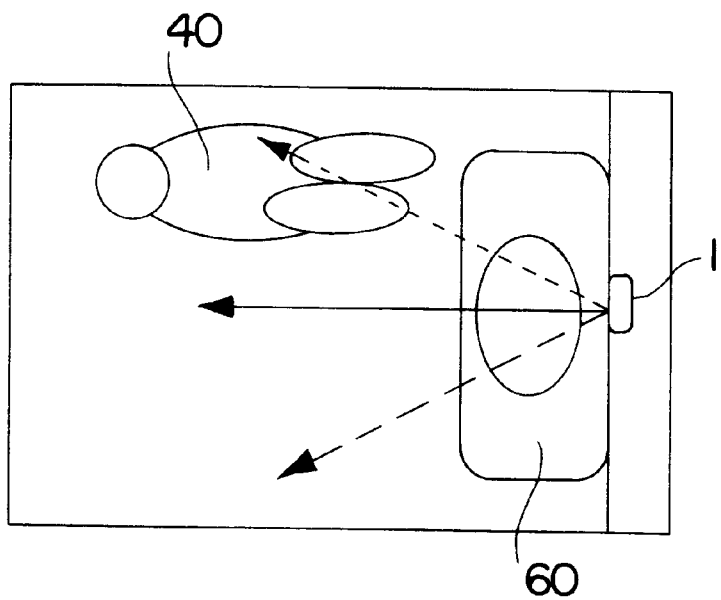
FIG. 15 is a schematic structural drawing describing the third embodiment of the present invention.
Figure 16:
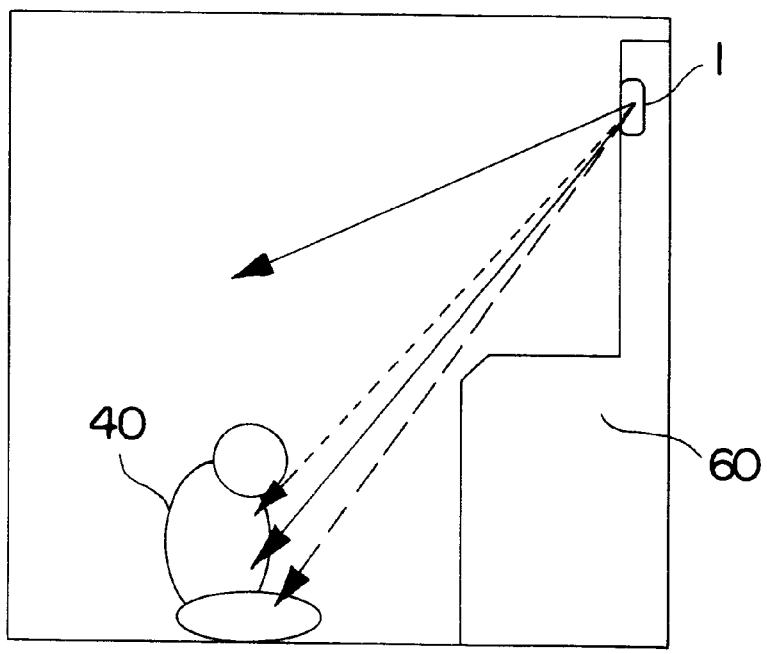
FIG. 16 is a schematic structural drawing describing the third embodiment of the present invention.

FIG. 14 to FIG. 16 are figures describing the third embodiment in a washing room of the present invention. In FIG. 14, (a) is a plan view of a condition where a person is standing seen from the ceiling, and (b) is a figure seen from the side. FIG. 15 is a plan view of a condition where a person is lying on its side seen from the ceiling, and FIG. 16 is a figure of a condition where a person is sitting down seen from the side.

As shown in FIG. 14, detecting means 1 including at least 4 pieces of distance sensors arranged on the front upper portion of the washing room which is an observing sector is provided, and it is set to be able to detect a person 40 using a washing stand 60 diagonally from the upper. Each of the detecting directions 1 to 4 is set such that the detecting directions 2, 4 are set to detect the front upper and lower portions, and that the detecting directions 1, 3 are set to detect the left and right lower portions. In the case when the condition has shifted from a condition like this to, for example, a condition where a person has fallen as shown in FIG. 15, the distance information of a distance shorter than the distance between the sensor and the floor occurs for a certain time or more, so that the condition may be judged abnormal. Furthermore, in the case when a person has crouched down on the floor as shown in FIG. 16, the judgment can similarly be done.

(Embodiment 4)

A condition detecting system according to a fourth embodiment of the present invention will be described by referring to drawings.

Figure 17A:
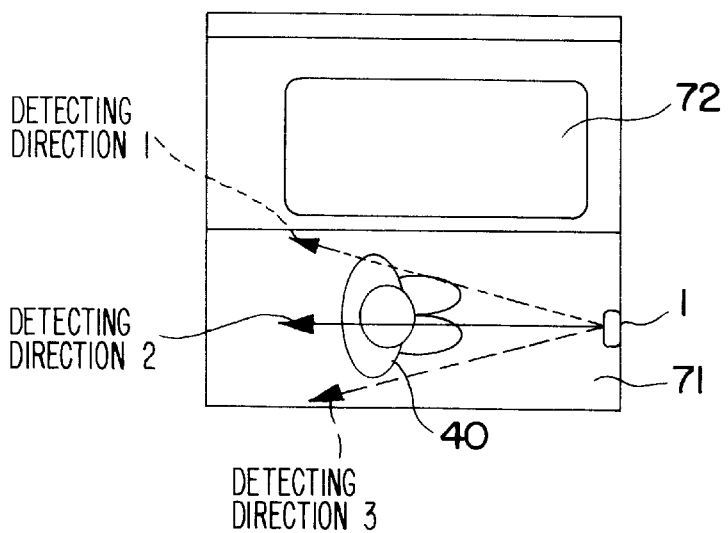
FIG. 17 is a schematic structural drawing describing a fourth embodiment of the present invention.
Figures 17B, 17C:
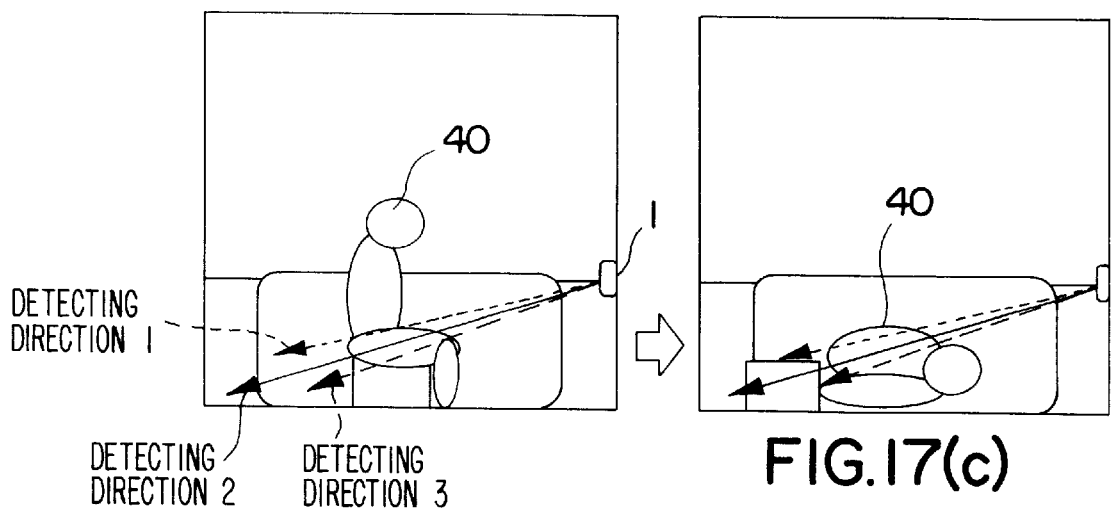
Figure 18:
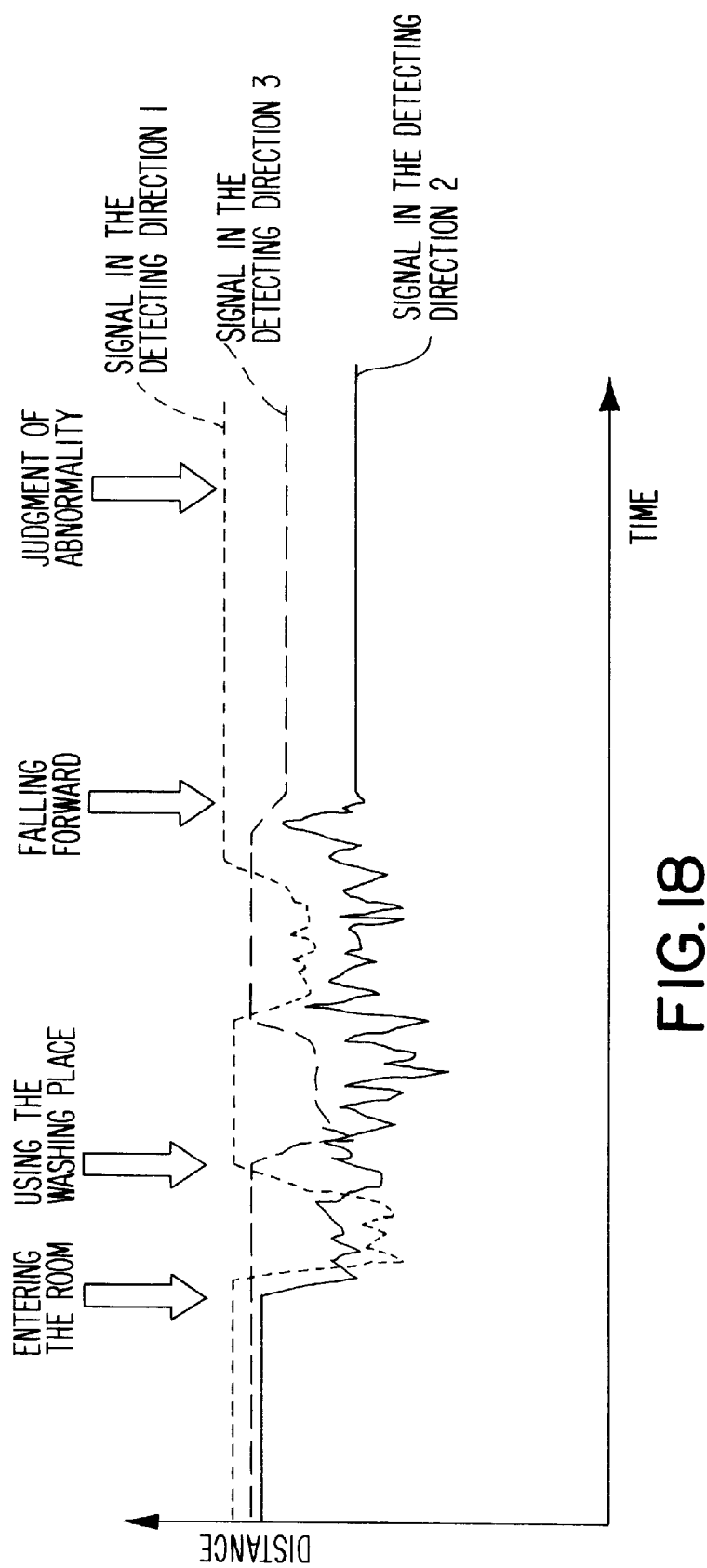
FIG. 18 is an explanation drawing of the sensor signal change describing another mode of the fourth embodiment of the present invention.
Figure 19A:
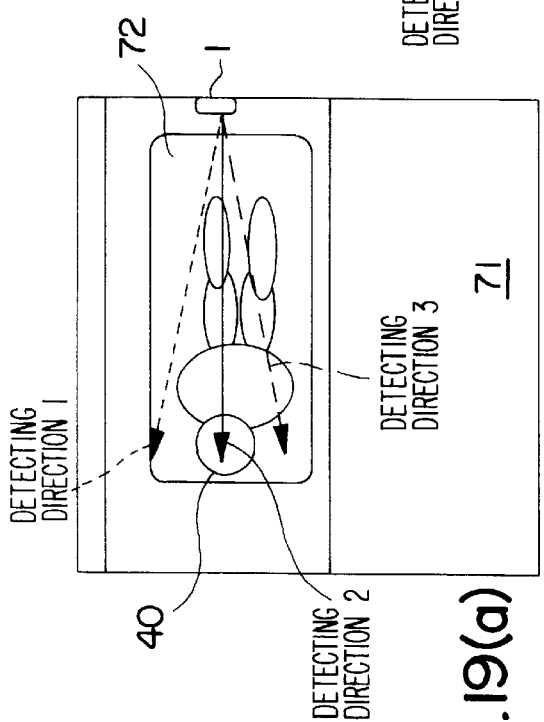
FIG. 19 is a schematic structural drawing describing the fourth embodiment of the present invention.
Figure 19B:
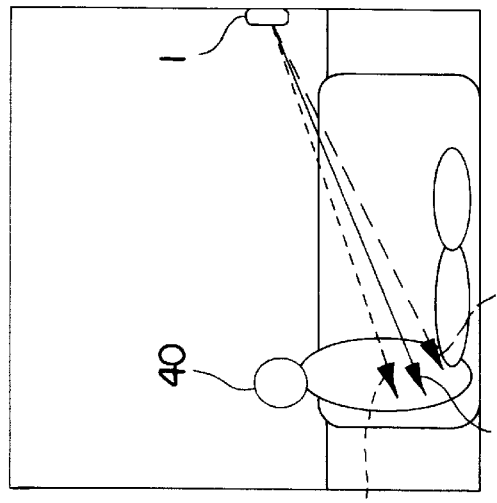
Figure 19C:
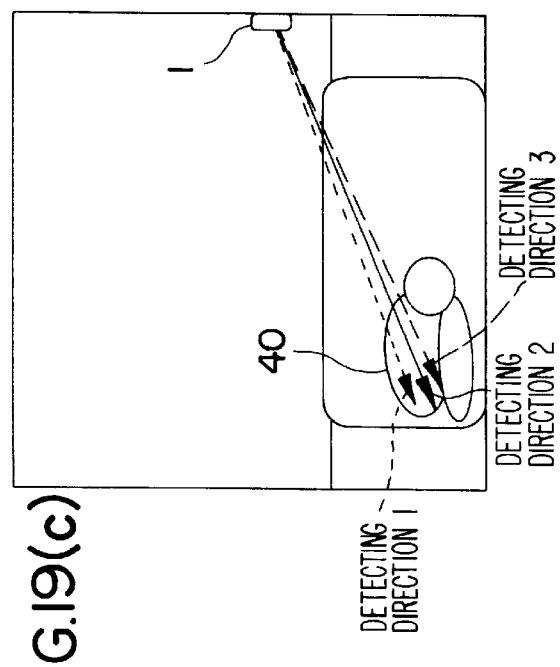
Figure 20:
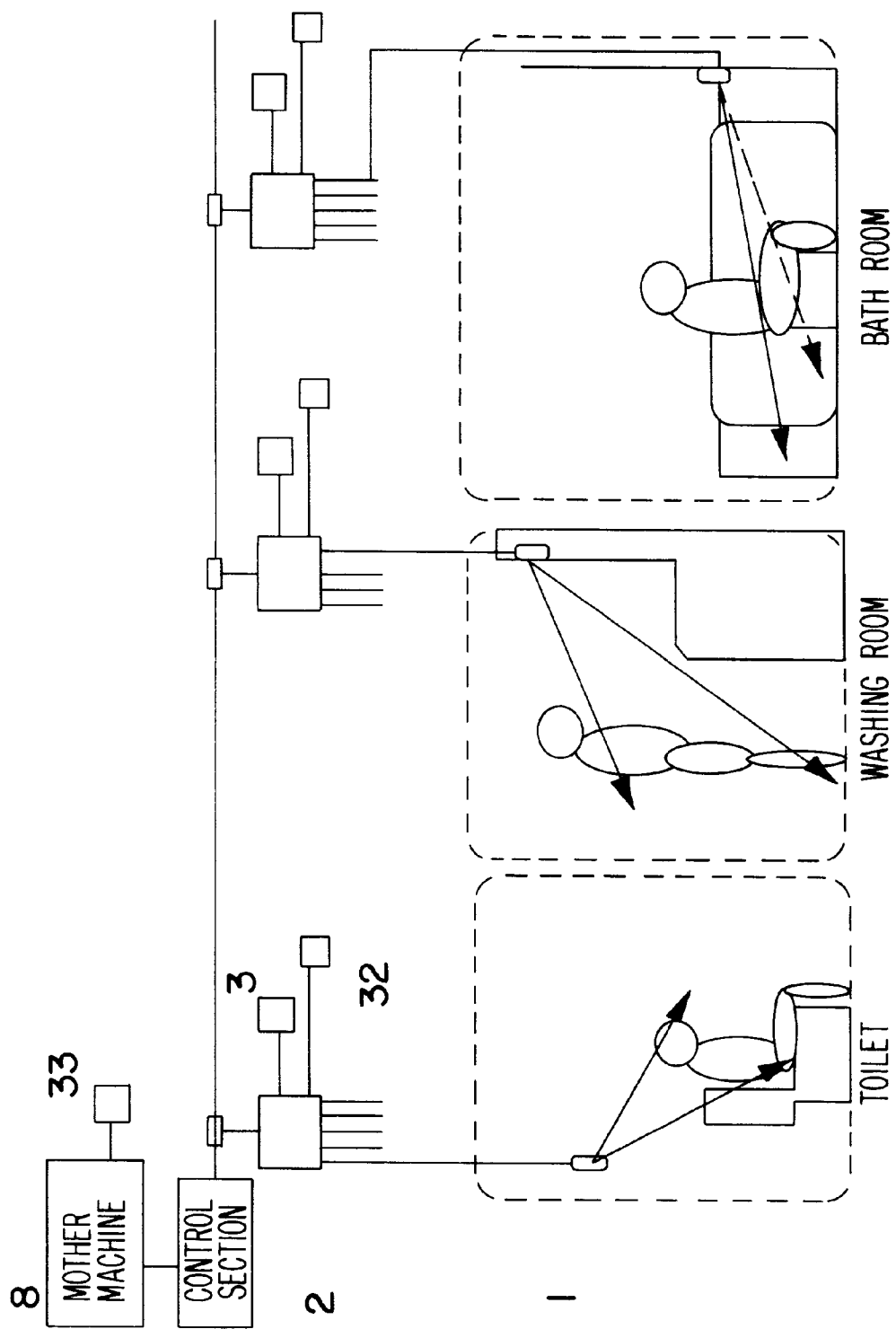
FIG. 20 is a schematic structural drawing describing the fifth embodiment of the present invention.

FIG. 17 to FIG. 19 are figures describing the fourth embodiment in a bath room of the present invention. In FIG. 17, (*a*) is a plan view seen from the ceiling, and (*b*) and (*c*) are figures seen from the side. FIG. 18 is a figure showing the change with the passage of time of the signals in the detecting directions of 3 distance sensors in the washing place. FIG. 19 (*a*) is a plan view showing another condition where a person is staying in the bathtub, and FIG. 19 (*b*) is a figure of that condition seen from the side, and (*c*) is a figure of another condition where a person has fallen forward seen from the side. As shown in FIG. 17, detecting means 1 including at least 3 pieces of distance sensors is provided at a comparatively lower part in the washing place of the bath room which is an observing sector, and it is set to be able to detect a person 40 using the washing place 71 diagonally from the upper. Each of the detecting directions 1 to 3 is set such that the detecting direction 2 is set to detect the lower portion and that the detecting directions 1, 3 are set to detect the left and right lower portions. For example, in the case when a person has fallen in a washing place while using the washing place, the signal from each detecting direction shown in FIG. 18 is obtained. That is, while the washing place is in use, the output of each distance sensor is fluctuating, but in the case when the person has fallen to be unmoving, the information of a distance shorter than that in the initial condition is constantly detected. In the case when this condition continues, for example, for 5 minutes or more, the condition is judged abnormal and a signal of abnormality is issued. Furthermore, as shown in FIG. 19, by providing detecting means 1 in which the detecting directions of a plurality of pieces of distance sensors are set to face to the interior of a bath tub, the movement of a person in the bath tub can be detected since the distance sensor of the present invention uses infrared rays of 800 nm to 1000 nm and the infrared rays can penetrate the water. That is, in the case when the person stays still in bath tub and does not move, a stationary and constant signal is detected in the distance shorter than the distance of reflection from the wall surface of the bath tub, and in the case when there is no fluctuation, for example, for 10 minutes or more, the condition can be judged abnormal.

The staying time in the observing sector for judging the condition abnormal may be determined according to the kind of a sector such as a toilet, a washing room, or a bath room which is an object, and a doubtful movement can also be detected at a cash corner of a financial institution or the like, which is not mentioned above.

By doing this, an abnormal service condition in an observing sector can be detected, and an accurate and highly reliable detection of a person can be performed, and further, the collective centralized processing and control can be performed, so that a detecting system of a person in an observing sector can be provided at a low cost.

As mentioned above, according to the present embodiment, a highly accurate and highly reliable condition detecting system of a person in an observing sector can be constructed, wherein a plurality of distance sensors are set on the ceiling portion or on the wall surface in the observing sector, and the movement of a person of the user and the rough attitude are detected from the change of the distance information, and an abnormal condition of the person is judged from this output, and further, only the position of an observing sector where a person exists for a long time can be reported to other persons and the safety in the observing sector can be ensured.

(Embodiment 5)

A detecting method of a person staying in a room according to a fifth embodiment of the present invention will be described below.

A plurality of pieces of detecting means 1 are set in a plurality of toilets, and these detecting means 1 are operated together by signal processing means 2, and the condition of a person in the toilet is judged, and it is made possible to detect whether there is such an abnormality that the staying time is abnormally long or that the person has fallen in the toilet or not. On the basis of the information obtained from the detecting means 1, a signal is transmitted as a contact point signal from the signal processing means 2 to an emergency calling line of a separate corridor light or the like of the nurse call system arranged on the corridor side, and warning means 3 such as a warning lamp is operated, and it is possible to inform a nurse.

Furthermore, the warning lamp as warning means 33 is turned on and off, or a warning alarm is issued in the central control means 8 of the nurse center on the basis of the judgment information outputted from the signal processing means 2, so that the toilet where abnormality has occurred can quickly be grasped at the nurse center. After the safety of the toilet where abnormality occurred has been confirmed, the occurrence of warning can be canceled by warning canceling means 32 set to the separate corridor light which is warning means, or by a canceling button in the central control means 8. The system automatically resumes the detection after the canceling of warning.

This system can provide a highly reliable and inexpensive condition detecting system and a system using that, wherein it is possible to detect an abnormal condition of a person in a place where it is difficult for the eye of a nurse to reach by connecting condition detecting systems of a person in a washing room and a bath room at the same time, and further, the centralized control is performed through an Ethernet, a nurse call system, or the like provided in a hospital, and an observing sector in use or an abnormal room is displayed on the monitor screen of the central control unit by means of communications in the building, and a warning is issued, so that abnormality in an observing sector or a room may easily be reported to other persons.

As mentioned above, according to the present embodiment, the information of a person from the detecting means is transmitted to the central control unit by using a communications network in the building, and the abnormality is reported to other persons, and consequently, the safety in a facility or a normal home can be ensured, and a highly accurate and highly reliable abnormality detecting system of a person can be constructed.

It is apparent from the above description that according to the present invention, the information of staying or the information of an abnormal attitude or the like of a user in an observing sector of a hospital can easily be obtained, and further, since the information of abnormality is reported to other persons by a warning lamp or the like, discovery in the early stages is possible even in the case when the observing sector is used for a long time or even in the case when the user has fallen because of apoplexy, so that the safety may sufficiently be obtained. Furthermore, since it is possible that the signal is introduced into the network in the building and the service condition of a room, an observing sector, or the like can centralizedly be controlled by using the central control unit, a detecting system of the person staying in a room can be obtained at a low cost. Especially, since the judgment of abnormality of the person in an observing sector is performed by signal processing means and only the signal of the observing sector is transmitted to the central control unit in the case when the condition is judged abnormal, a real time observation can be performed.

Accordingly, by using the present invention, a condition detection of the person which has high reliability and safety can be performed easily and highly accurately, which can significantly contribute to the construction of an intelligent system in a hospital, the ensuring of safety in an apartment for solitary persons, or the like.

What is claimed is:

1. A condition detecting system for detecting existence and condition of a person in a specific observing sector comprising:

detecting means including a plurality of pieces of distance sensors arranged at one corner of said observing sector; and judging means for judging condition of a staying person in said observing sector on the basis of information from the detecting means, wherein each of said plurality of pieces of distance sensors is set to be able to detect condition of the person in a different direction.

2. The condition detecting system according to claim 1 further comprising signal processing means including a signal transmitting section for transmitting results of judgment attained by said judging means.

3. The condition detecting system according to claim 2 further comprising warning means for issuing a waning on the basis of a signal from said signal transmitting section.

4. The condition detecting system according to claim 3 further comprising warning canceling means for performing cancel of said warning means.

5. The condition detecting system according to claim 3, wherein said plurality of pieces of distance sensors are distance sensors using infrared ray beams, or ultrasonic sensors using transmitting and receiving of ultrasonic waves, or combinations of said two kinds of sensors.

6. The condition detecting system according to claim 3, wherein said warning means works when said judging means judges that a person whose existence is detected does not go out even if a previously determined specified time has elapsed, or when said judging means judges that the person is in an abnormal condition.

7. The condition detecting system according to claim 2, wherein said plurality of pieces of distance sensors are distance sensors using infrared ray beams, or ultrasonic sensors using transmitting and receiving of ultrasonic waves, or combinations of said two kinds of sensors.

8. The condition detecting system according to claim 1, wherein said plurality of pieces of distance sensors are distance sensors using infrared ray beams, or ultrasonic sensors using transmitting and receiving of ultrasonic waves, or combinations of said two kinds of sensors.

9. The condition detecting system according to claim 1, wherein said judging means and said data transmitting section are included in signal processing means and the judging means is realized in terms of software by using a computer.

10. The condition detecting system according to claim 1, wherein said observing sector is a toilet, and staying of a user of the toilet for a long time or an abnormal condition is detected by detecting means including a plurality of pieces of distance sensors arranged at one corner in said toilet.

11. The condition detecting system according to claim 10, wherein said toilet is a Western style toilet and said detecting means is arranged at the front of the Western style toilet or at the upper back portion.

12. The condition detecting system according to claim 1, wherein said observing sector is a washing room, and staying for a long time or an abnormal attitude such as falling down or crouching down is detected by detecting means including a plurality of pieces of distance sensors arranged at one corner in the washing room.

13. The condition detecting system according to claim 1, wherein said observing sector is a bath room, and staying for a long time or an abnormal attitude such as falling down or crouching down in a washing place or a bath tub is detected by detecting means including a plurality of pieces of distance sensors arranged at one corner of the bath room.

14. A condition detecting system for detecting condition of a person covering a plurality of observing sectors, wherein detecting means including a plurality of pieces of distance sensors is arranged at one corner of each observing sector, and each output signal of the detecting means is inputted into one judging means which judges condition of a staying person in said observing sector on the basis of information from the detecting means.

15. The condition detecting system according to claim 14 further comprising warning means for issuing a warning on the basis of a signal from said judging means.

16. The condition detecting system according to claim 15 further comprising warning canceling means for canceling a warning of said warning means.

17. The condition detecting system according to claim 16, wherein when said judging means judges that a person is staying for a long time after a certain time has elapsed, or when said judging means judges that abnormality occurs in an attitude of a staying person, said judging means reports the result of judgment to a centralized control system such as a nurse call system as a contact point signal.

18. The condition detecting system according to claim 15, wherein when said judging means judges that a person is staying for a long time after a certain time has elapsed, or when said judging means judges that abnormality occurs in an attitude of a staying person, said judging means reports the result of judgment to a centralized control system such as a nurse call system as a contact point signal.

19. The condition detecting system according to claim 14, wherein when said judging means judges that a person is staying for a long time after a certain time has elapsed, or when said judging means judges that abnormality occurs in an attitude of a staying person, said judging means reports the result of judgment to a centralized control system such as a nurse call system as a contact point signal.

20. The condition detecting system according to claim 19, wherein said centralized control system turns on and off a separate corridor light or a separate warning lamp, or issues a warning alarm on the basis of said result of judgment.

21. The condition detecting system according to claim 20, wherein said centralized control system stops the warning in the case when said centralized control system receives a result of judgment that a person does not exist in said observing sector, while issuing a warning.

22. The condition detecting system according to claim 19, wherein the warning is canceled and at the same time and measuring is automatically resumed by canceling of said separate corridor light, or by a canceling action of a canceling button in said centralized control system.

* * * * *